W. F. RICHARDS.
HAND BRAKE.
APPLICATION FILED AUG. 7, 1919.

1,343,061.

Patented June 8, 1920.

Inventor
Willard F. Richards
By Brouner Phelps
Attorneys

UNITED STATES PATENT OFFICE.

WILLARD F. RICHARDS, OF DEPEW, NEW YORK, ASSIGNOR, BY MESNE ASSIGNMENTS, TO THE ATLANTIC HAND BRAKE CORPORATION.

HAND-BRAKE.

1,343,061.　　　　　Specification of Letters Patent.　　Patented June 8, 1920.

Application filed August 7, 1919. Serial No. 315,917.

*To all whom it may concern:*

Be it known that I, WILLARD F. RICHARDS, a citizen of the United States, residing at Depew, in the county of Erie and State of New York, have invented certain new and useful Improvements in Hand-Brakes, of which the following is a specification.

This invention relates to improvements in hand brakes and more particularly to brakes particularly adapted for use on railway vehicles.

One of the objects of the present invention is to provide a high power, quick-acting hand brake applicable to the brake rigging now in general use on railway vehicles, as well as one having relatively few parts, which may be inexpensively manufactured, assembled and installed.

A further object is to provide a reliable and highly efficient hand brake of durable construction and which will be unaffected by atmospheric conditions.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1:
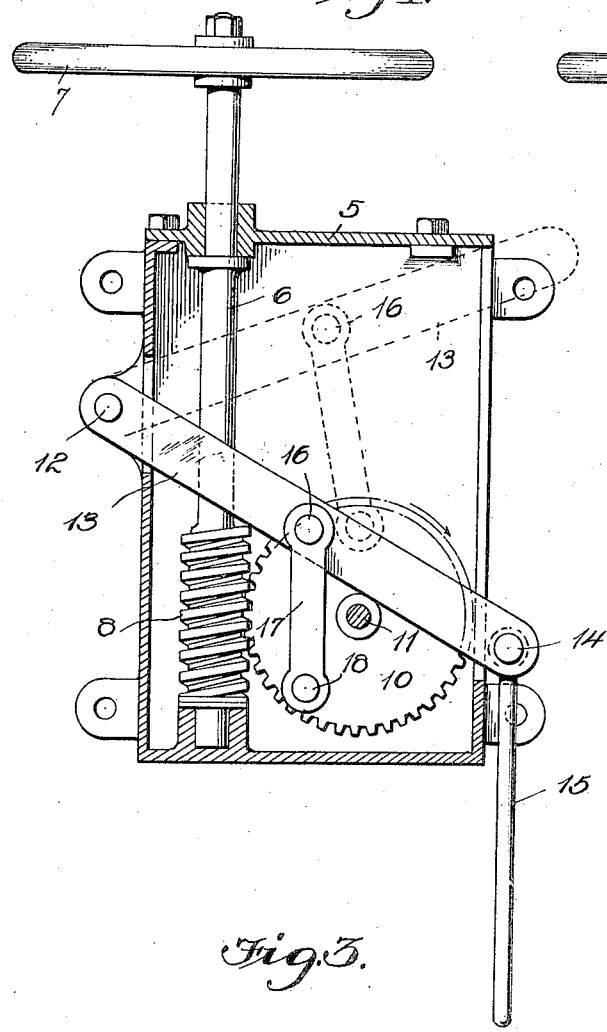
Figure 1 is a front sectional and elevational view of such parts of the brake mechanism as are necessary to understand the invention.
Figure 2:
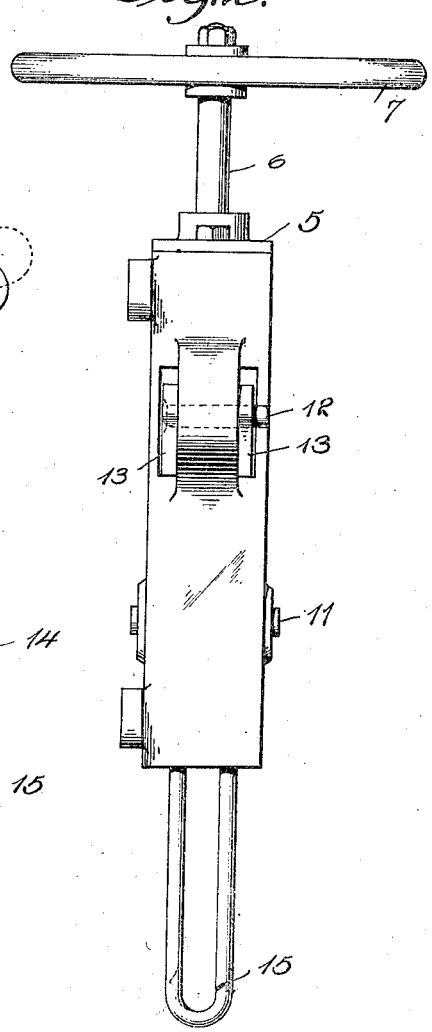
Fig. 2 is a side view thereof.
Figure 3:
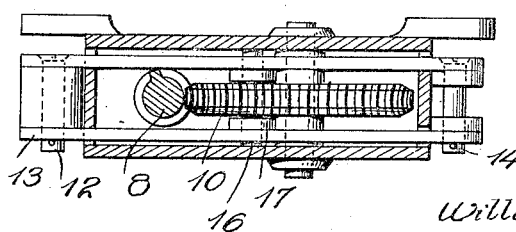
Fig. 3 is a horizontal section.

Referring now to the drawings in detail, 5 denotes a casing of any desired shape and size, adapted to be secured by suitable fastening means to the front wall of a freight car, for example. This casing preferably has a removable front cover for convenience in assembling the parts. Within the casing is a relatively short shaft 6 provided with operating means, such as hand wheel 7. The shaft 6 is mounted in suitable bearings in the upper and lower wall so as to prevent bending or dislocation thereof, and the central part is provided with a worm 8 adapted to mesh with a pinion or gear 10 pivotally supported at 11 in the casing 5. Secured to a rigid part of the casing, such as the point 12, is a duplex lever 13 projecting out through the side of the box or casing and having its outer end 14 connecting to a chain or pull rod 15 extending downwardly to the brake rigging.

Intermediate the points 12 and 14 there is attached, as at 16, a duplex link 17 pivoted at 18 to the wheel or gear 10.

It will thus be seen that as the worm 8 is rotated and the gear 10 turned about its pivot 11 this link 17 will force the lever 13 upwardly to dotted line position, consequently raising the outer end 14 and exerting a powerful pull upon the connecting mechanism 15. The bearings are arranged substantially as shown and may be provided with ball thrust bearings to permit ease of operation. The pitch of the threaded worm and coacting gear is such as to hold the brake in set position, thereby eliminating the use of ratchets or other holding mechanism, which occasionally slip with disastrous results.

It will be seen that the invention is of very simple and practical construction, having relatively few parts, which may be easily and quickly assembled, and is unlikely to get out of order, thus rendering the brake mechanism highly efficient in operation.

I realize that considerable variation is possible in the details of construction and arrangement of parts without departing from the spirit of my invention, and I therefore do not intend to limit myself to the specific form shown and described.

I claim:

1. In a brake mechanism, in combination, a worm, a pinion adapted to be turned as the brakes are applied, a lever connected with the brake rigging, and means including a floating link for moving said lever about its fulcrum interposed between the lever and the pinion.

2. In a brake mechanism, in combination, a brake staff having a worm, a pinion meshing therewith, a lever pivotally supported at one end and connected with the brake rigging at its other end, and a link connecting said lever between its ends with said pinion, whereby as the pinion rotates the lever will be moved up and down.

3. In a brake mechanism, in combination, a casing, a shaft mounted in said casing provided with hand operating means, a worm on said shaft, a pinion meshing with said worm, a lever fulcrumed at one end, and means between the lever and the pinion for moving said lever up and down as the pinion rotates.

4. In a brake mechanism, in combination, a casing having a shaft mounted therein, a worm, and a gear associated with said shaft, a lever fulcrumed at one side of said casing, and a link connecting the central part of said lever with said gear whereby the lever is moved up and down as the pinion rotates.

5. In a brake mechanism, in combination, an inclosed casing having an opening at one side through which a lever is adapted to pass, a fulcrum associated with said casing for said lever, a shaft having hand-operated means, and a member connected with said lever for moving the lever up and down as the hand-operated means is actuated.

6. In a brake mechanism, in combination, an inclosed casing having an opening at one side through which a duplex lever is adapted to pass, a fulcrum associated with said casing for said lever, a shaft having hand-operated means, and a duplex member connected with said lever for moving the lever up and down as the hand-operated means is actuated.

7. In a brake mechanism, in combination, a casing having an opening at one side thereof, a shaft having bearing portions in the upper and lower walls of said casing, a lever pivotally mounted in said casing and extending outwardly through said opening, a worm on said shaft, a pinion meshing therewith, and a link interposed between the pinion and the lever whereby the lever is moved up and down as the pinion is rotated.

8. In a brake mechanism, in combination, a casing having an opening at one side thereof, a shaft having bearing portions in the upper and lower walls of said casing, a lever pivotally mounted in said casing and extending outwardly through said opening, a worm on said shaft, a pinion meshing therewith, and a link interposed between the pinion and the lever whereby the lever is moved up and down as the pinion is rotated, said lever and link being of duplex type to equalize the strains.

In testimony whereof I affix my signature.

WILLARD F. RICHARDS.